United States Patent
Parrish et al.

(10) Patent No.: US 7,860,665 B2
(45) Date of Patent: Dec. 28, 2010

(54) METHOD AND SYSTEM FOR DETERMINING THE TORQUE INDUCED IN A ROTATING SHAFT

(75) Inventors: Colin Parrish, Derby (GB); James Roberts, Derby (GB); Leighton Tipton, Derby (GB)

(73) Assignee: Rolls-Royce plc, London (GB)

( * ) Notice: Subject to any disclaimer, the term of this patent is extended or adjusted under 35 U.S.C. 154(b) by 257 days.

(21) Appl. No.: 12/213,089

(22) Filed: Jun. 13, 2008

(65) Prior Publication Data
US 2008/0319684 A1    Dec. 25, 2008

(30) Foreign Application Priority Data
Jun. 20, 2007    (GB) .................... 0711890.4

(51) Int. Cl.
*G01L 3/00* (2006.01)
*G01L 5/00* (2006.01)
(52) U.S. Cl. .................................. 702/43; 702/41
(58) Field of Classification Search .............. 702/41, 702/43, 54, 56, 75, 151; 73/570, 579, 862, 73/862.08, 862.23
See application file for complete search history.

(56) References Cited

U.S. PATENT DOCUMENTS

| | | | | |
|---|---|---|---|---|
| 4,525,068 A | * | 6/1985 | Mannava et al. | 356/35.5 |
| 5,438,882 A | * | 8/1995 | Karim-Panahi et al. | 73/862.324 |
| 6,405,595 B1 | * | 6/2002 | Harrison | 73/573 |
| 2006/0032319 A1 | | 2/2006 | Zielinski | |
| 2007/0068279 A1 | * | 3/2007 | Abele | 73/862.08 |
| 2009/0312959 A1 | * | 12/2009 | Borman | 702/41 |

FOREIGN PATENT DOCUMENTS

EP    0 608 993 A3    8/1994

* cited by examiner

*Primary Examiner*—Michael P Nghiem
(74) *Attorney, Agent, or Firm*—Oliff & Berridge, PLC

(57) ABSTRACT

A rotating shaft has a torsional oscillation frequency that is dependent on the stiffness of the shaft. The torsional oscillation frequency and the stiffness are dependent upon the operating conditions of the shaft. The torque of the rotating shaft is determined by measuring the torsional oscillation frequency of the rotating shaft; measuring the twist induced in the rotating shaft by the torque; and using the measured value of the torsional oscillation frequency and the measured value of the induced twist to determine the torque induced in the shaft.

19 Claims, 3 Drawing Sheets

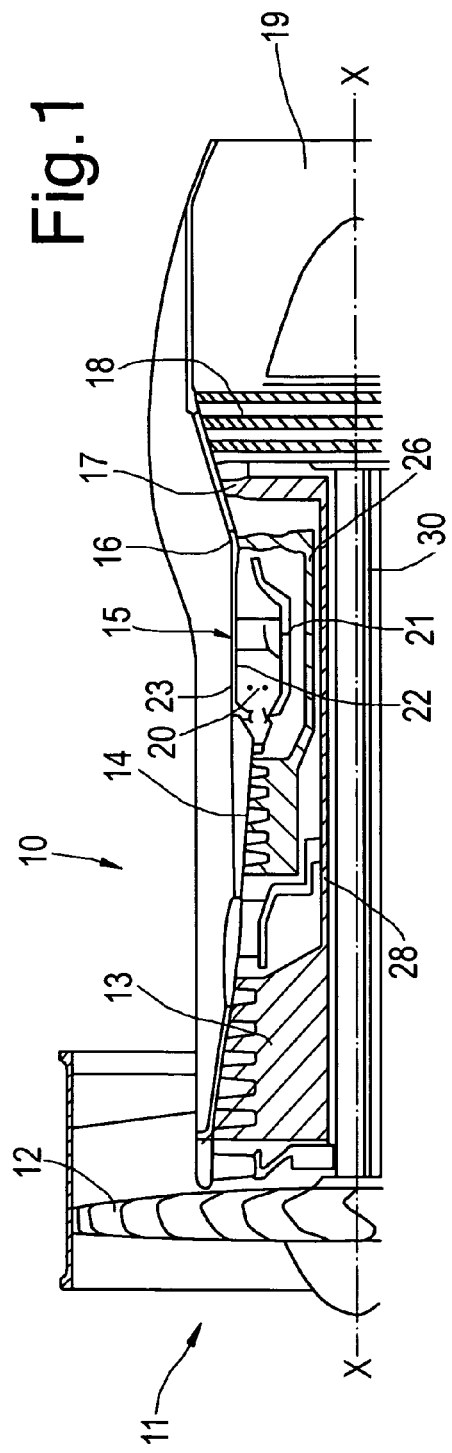
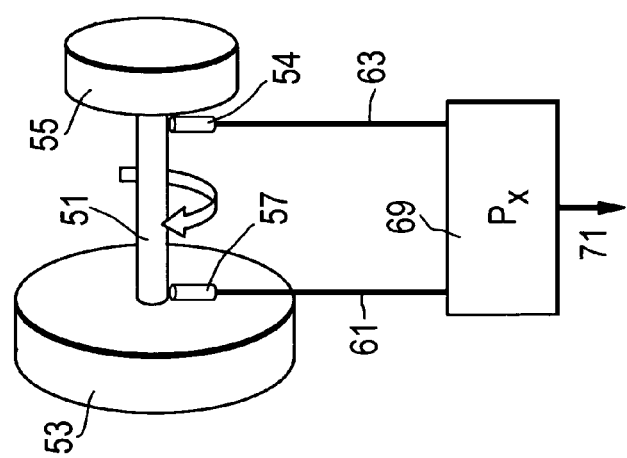

METHOD AND SYSTEM FOR DETERMINING THE TORQUE INDUCED IN A ROTATING SHAFT

BACKGROUND

Embodiments of the present invention relate to a method and system for determining the torque induced in a rotating shaft. In particular the invention relates to a method and system for determining the torque induced in a shaft in a turbine engine.

It is often useful to be able to measure the torque induced in a rotating shaft such as a shaft in a turbine engine. The torque induced in a shaft in a turbine engine is related to the power produced by the engine so a measurement of the torque may provide an indication of the performance of an engine. Such measurements may be useful during the testing and development of an engine or during the use of an engine for control or health monitoring purposes.

The torque T induced in a rotating shaft is given by $$T = \epsilon \theta$$

Where $\epsilon$ is the torsional stiffness of the shaft and $\theta$ is the angle of the twist induced in the shaft.

Methods of measuring the angle of twist over a range of operating conditions are well known in the art. Apparatus suitable for making such measurements, such as multipole sensors and strain gauges, are also well known.

The torsional stiffness of a shaft is a measure of the resistance of the shaft to being twisted. It can be difficult to obtain an instantaneous value of the torsional stiffness of a shaft in a turbine engine because the mechanical properties of the shaft depend on a number of factors including operating conditions such as temperature and pressure and the history of use of the shaft. In a turbine engine the operating conditions may vary along the length of the shaft so the stiffness of the shaft may also vary along the length of the shaft. This makes it difficult to compute an accurate model which can be used to determine an instantaneous value of the stiffness while the shaft is in use.

SUMMARY

According to an embodiment of the invention there is provided a method of determining the torque induced in a rotating shaft, the shaft having a torsional oscillation frequency that is related to the stiffness of the shaft, where the torsional oscillation frequency and the stiffness are dependent upon the operating conditions of the shaft, the method comprising: measuring the torsional oscillation frequency of the rotating shaft; measuring the twist induced in the rotating shaft by the torque; and using the measured value of the torsional oscillation frequency and the measured value of the induced twist to determine the torque induced in the shaft.

Embodiments of the invention provide the advantage that a value for the torque induced in the shaft can be determined without requiring a direct measurement of the stiffness of the shaft. This enables a measurement of the torque to be made at a range of operating conditions.

According to embodiments of the invention there is also provided a system for determining the torque induced in a rotating shaft, the shaft having a torsional oscillation frequency that is related to the stiffness of the shaft, where the torsional oscillation frequency and the stiffness are dependent upon the operating conditions of the shaft, comprising a pair of sensors for measuring the induced twist in the shaft, spaced axially along the shaft; measuring means for measuring the torsional oscillation frequency of the shaft; and a processor for using the measured value of the torsional oscillation frequency and the measured value of the induced twist to determine the torque induced in the shaft.

Further embodiments of the invention are described in the sub claims.

BRIEF DESCRIPTION OF THE DRAWINGS

For a better understanding of the present invention reference will now be made by way of example only to the accompanying drawings in which:

FIG. 1 is a sectional side view of the upper half of a gas turbine engine;

FIG. 2 is a diagrammatic illustration of system for measuring the torque induced in a shaft according to embodiments of the inventions;

DETAILED DESCRIPTION OF EMBODIMENTS

Figure 3:
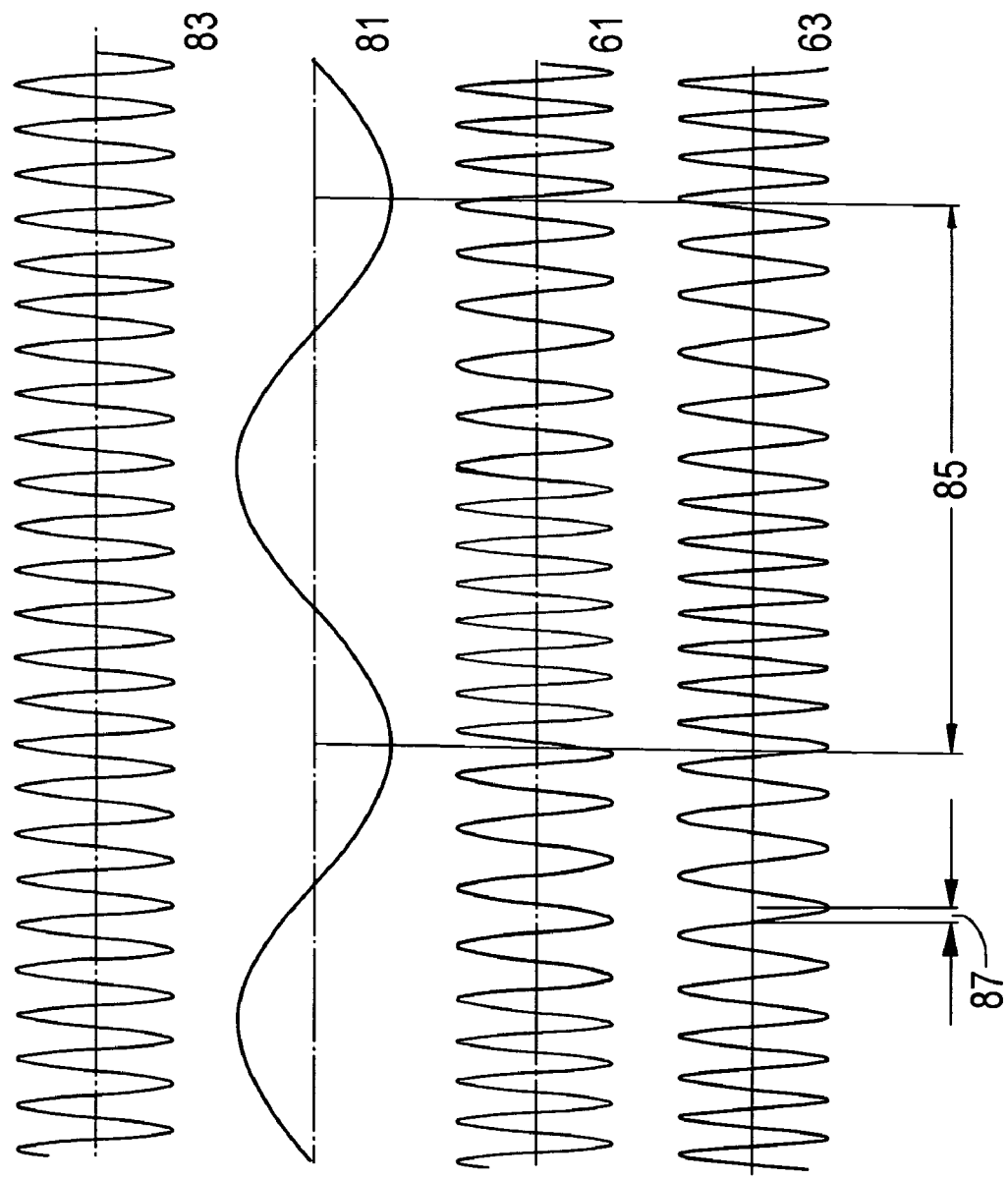
FIG. 3 illustrates the outputs of the sensors of the system illustrated in FIG. 2.

The figures illustrate a method of determining the torque induced in a rotating shaft 51, the shaft 51 having a torsional oscillation frequency that is related to the stiffness of the shaft 51, where the torsional oscillation frequency and the stiffness are dependent upon the operating conditions of the shaft 51, the method comprising: measuring 31 the torsional oscillation frequency of the rotating shaft 51; measuring 39 the twist induced in the rotating shaft 51 by the torque; and using 41 the measured value of the torsional oscillation frequency and the measured value of the induced twist to determine the torque induced in the shaft 51.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high intermediate and low pressure turbines 16, 17 and 18 respectively drive the high and intermediate pressure compressors, 14 and 13 and the fan 12 by suitable interconnecting shafts.

FIG. 2 illustrates a system for determining the torque induced in a rotating shaft 51 according to an embodiment of the invention. The shaft 51 has a compressor 53 attached at one end and a turbine 55 attached at the other end. The shaft 51, compressor 53 and turbine 55 may be in section of a turbine engine such as the engine illustrated in FIG. 1.

The system includes a first sensor 57 positioned at a first end of the shaft 51 and a second sensor 54 positioned at the second end of the shaft 51. In other embodiments of the invention the sensors 57 and 54 may be positioned at any two points separated along the axis of the shaft 51. However it is advantageous to position the sensors as far apart as possible as this may improve the accuracy of the measurements.

In this embodiment the sensors 57 and 54 are used to measure both the torsional oscillation frequency of the shaft 51 and the angle of twist induced in the shaft 51. In other embodiments different sensors could be used to make each of these measurements.

In some embodiments the two sensors 57 and 54 may be the same type of sensor as this may simplify the processing of the output signals 61 and 63. In other embodiments it may be advantageous to use different types of sensors at different ends of the shaft 51. For example if the operating conditions vary along the length of the shaft 51 a sensor which is suitable for use at one end may not be suitable to provide an accurate measurements at the other end.

In some embodiments the sensors 57 and 54 may be, for example, multipole sensors such as phonic wheel sensors. Such sensors comprise a wheel with multiple teeth around the rim which is attached to the shaft 51 so that it rotates with the shaft 51. A detector is positioned to detect when the teeth pass the detector. The detector may be any device operable to measure a physical quantity which changes when one of the teeth passes and convert that measurement into an electrical signal. The detector may be, for example a metal plate for detecting the change in capacitance when one of the teeth passes the plate. Alternatively the detector may be able to detect a change in the local magnetic field or a variation in reluctance or an optical sensor.

FIG. 3 illustrates the outputs 61 and 63 of the sensors 57 and 54 according to an embodiment of the invention where multipole sensors are used. The outputs 61 and 63 comprise two components 81 and 83. The first component is a carrier 83 having a mean frequency dependent on the rotational frequency of the shaft 51 and the number of poles provided by the sensor. The carrier 83 is modulated by the torsional oscillation 81 of the shaft 51. The period 85 of frequency modulation of the output signals 61 and 63 is indicative of the frequency of torsional oscillation of the shaft 51. In this embodiment, the frequency of torsional oscillation 81 is much lower than the frequency of the outputs signals 61 and 63 of the multipole sensors 57 and 59.

The mean phase difference 87 between output signals 61 and 63 changes as the shaft 51 is twisted by the applied torque. The change in the phase difference 87 gives a measure of the angle of the twist induced in the shaft 51.

The outputs 61 and 63 of the sensors 57 and 54 are provided as the inputs to the processor 69. The processor 69 is operable to convert the signals 61 and 63 into a measurement of the torque induced in the shaft using the method described below.

In some embodiments the system may comprise circuitry for converting the outputs 61 and 63 into a form suitable for input for a processor. For example the processing circuitry may comprise an analogue to digital converter for converting the analogue signals 61 and 63 into a digital signal.

The processor 69 is operable to determine the phase difference between the signals 61 and 63 to determine the angle of twist induced in the shaft. The processor 69 also determines the period of the variation of frequency of the signals 61 and 63 to determine the torsional oscillation frequency of the shaft.

In some embodiments the inputs 61 and 63 may be combined by the processor 69 before the signals are analyzed.

The processor 69 may have already stored values for stiffness and frequency at the calibration conditions. In some embodiments these values may be obtained from measurements made earlier or they may have been programmed into the processor 69. These values are then used to determine a value for the torque induced in the shaft.

In the embodiment illustrated in FIG. 3 the processor 69 is a single entity. In other embodiments the processor 69 may be a number of separate entities.

The processor 69 may be remote from the sensors so that the output signals 61 and 63 may be transmitted to the processor 69.

Figure 4:
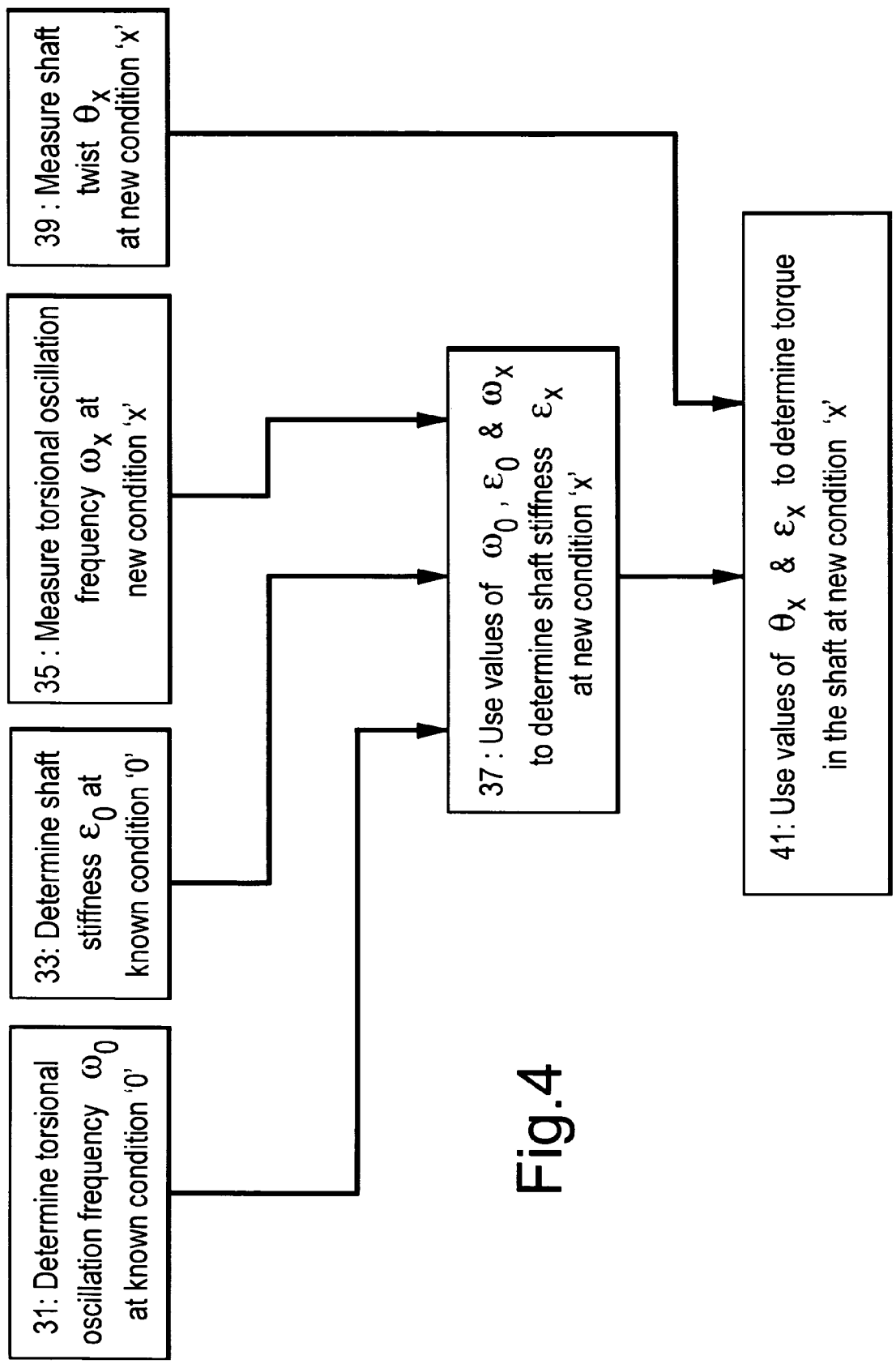
FIG. 4 is a flow diagram illustrating the method steps of embodiments of the invention.

FIG. 4 is a diagram which sets out the steps of a method of determining the torque induced in a rotating shaft 51 according to embodiments of the invention using a system such as the above described system.

At steps 31 and 33 the shaft 51 is calibrated by determining the natural torsional oscillation $\omega_0$ of the shaft 51 and the stiffness $\epsilon_0$ of the shaft at a calibration set of conditions "0".

The natural torsional oscillation frequency is a fundamental harmonic frequency at which the shaft 51 will vibrate. In turbine engines the natural torsional oscillation frequency is generally much lower than the rotational frequency of the shaft 51.

At any condition "x" the natural torsional oscillation frequency $\omega_x$ of the shaft is given by $$\omega_x \alpha \left(\frac{\varepsilon_x}{I}\right)^{\frac{1}{2}}$$

where $\epsilon_x$ is the torsional stiffness of the shaft 51 at condition "x" and I is the moment of inertia of the shaft 51. The moment of inertia of a shaft 51 is approximately constant over the operating range of a turbine engine. Therefore, there is a direct relationship between $\omega_x$ and $\epsilon_x$.

If I is not known and it is not possible to measure it accurately it may be possible to determine a value of $\epsilon_0$ by applying a set of known torques to the shaft 51 at the calibration conditions and measuring the resultant twists.

The steps 31 and 33 of determining $\omega_0$ and $\epsilon_0$ may occur in either order or even simultaneously.

At step 35 the torsional oscillation frequency $\omega_x$ is measured at a different set of conditions "x". This set of conditions may be the conditions while the engine is in use while the previous set of conditions "0" may be a set of controlled test conditions.

As the natural torsional oscillation frequency is directly related to the stiffness of the shaft the measurements of the natural torsional oscillation frequency, together with measurements of the induced twist, can be used in order to determine the applied torque.

As I is constant the ratio of the square of the oscillation frequency to the stiffness is constant. Therefore the stiffness of the shaft at a given set of conditions x is given by $$\varepsilon_x = \varepsilon_0 \left(\frac{\omega_x}{\omega_0}\right)^2$$

where $\epsilon_0$ is the stiffness at the calibration conditions, $\omega_0$ is the natural oscillation frequency at the calibration conditions and $\omega_x$ is the oscillation frequency at conditions x. Therefore a value of $\epsilon_x$ can be obtained from the measured value of $\epsilon_0$, $\omega_0$ and $\omega_x$, without accurate knowledge of I.

In the exemplary method illustrated in FIG. 4, at step 37 the stiffness at the second set of conditions is determined. In other embodiments this step may be omitted and the values of $\epsilon_0$, $\omega_0$ and $\omega_x$, in conjunction with the measured induced twist, may be used directly to determine the torque.

Substituting the relationship for stiffness $\epsilon_x$ into the relationship for torque T given above gives $$T_x = \theta_x\left(\epsilon_0\left(\frac{\omega_x^2}{\omega_0^2}\right)\right).$$

Therefore it can be clearly seen that it is not necessary to actually calculate the stiffness at conditions x as the torque can be derived from the stiffness $\epsilon_0$, the two oscillation frequencies $\omega_0$ and $\omega_x$ and the twist $\theta_x$.

At step 39 the angle $\theta_x$ of twist induced in the shaft at the second set of conditions is measured. The step 39 of measuring $\theta_x$ may follow the steps 35 and 37 of measuring $\omega_x$ and determining $\epsilon_x$. In other embodiments steps 35 and 37 may follow step 39 or the steps may occur simultaneously.

At step 41 the measured value of $\theta_x$ and the obtained value of $\epsilon_x$ are used to determine the torque induced in the shaft at the conditions x.

Although embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of determining a torque induced in a rotating shaft, the shaft having a torsional oscillation frequency that is dependent on a stiffness of the shaft, wherein the torsional oscillation frequency and the stiffness are dependent upon operating conditions of the shaft, the method comprising:
   measuring the torsional oscillation frequency of the rotating shaft;
   measuring a twist induced in the rotating shaft by the torque;
   using the measured value of the torsional oscillation frequency and the measured value of the induced twist to determine the torque induced in the shaft,
   wherein the torsional oscillation frequency of the shaft and the induced twist are measured at a first set of operating conditions; and
   determining a torsional oscillation frequency of the shaft at a second set of operating conditions at which the stiffness of the shaft is determined to determine the torque induced in the shaft.

2. A method as claimed in claim 1 wherein the torque induced in the shaft is determined using the measured torsional oscillation frequency and the induced twist at the first set of operating conditions, and the measured torsional oscillation frequency and the stiffness at the second set of operating conditions.

3. A method as claimed in claim 2 wherein the torque is determined as follows:

$$T_1 = \theta_1\epsilon_2\left(\frac{\omega_1^2}{\omega_2^2}\right)$$

where; $T_1$ is the torque at the first set of operating conditions,
$\theta_1$ is the induced twist at the first set of operating conditions,
$\epsilon_2$ is the stiffness of the shaft at the second set of operating conditions,
$\omega_1$ is the measured torsional oscillation frequency at the first set of operating conditions,
$\omega_2$ is the measured torsional oscillation frequency at the second set of operating conditions.

4. A method as claimed in claim 3 wherein the stiffness of the shaft at the second set of operating conditions is determined by applying known torques to the shaft and measuring the resultant twists.

5. A method as claimed in claim 1 wherein twist in the shaft is measured using two sensors spaced axially along the shaft.

6. A method as claimed in claim 5 wherein the sensors are multipole sensors.

7. A method as claimed in claim 1 wherein the sensors used to measure the induced twist are also used to measure the oscillation frequency.

8. A method as claimed in claim 1 wherein a temperature of the shaft varies between the first and second set of operating conditions.

9. A method as claimed in claim 8 wherein a change in a moment of inertia of the shaft between the first set of operating conditions and the second set of operating conditions is negligible.

10. A method as claimed in claim 1 wherein the shaft is in a gas turbine engine.

11. A system for determining a torque induced in a rotating shaft, the shaft having a torsional oscillation frequency that is dependent on a stiffness of the shaft, wherein the torsional oscillation frequency and the stiffness are dependent upon operating conditions of the shaft, comprising:
    a pair of sensors for measuring an induced twist in the shaft, spaced axially along the shaft;
    measuring means for measuring the torsional oscillation frequency of the shaft; and
    a processor for using the measured value of the torsional oscillation frequency and the measured value of the induced twist to determine the torque induced in the shaft,
    wherein the pair of sensors are operable to measure the induced twist and the measuring means are operable to measure the torsional oscillation frequency at a first set of operating conditions, and
    wherein the measuring means are also operable to measure a torsional oscillation frequency of the shaft at a second set of operating conditions at which the stiffness of the shaft is determined to determine the torque induced in the shaft.

12. A system as claimed in claim 11 wherein the processor uses the measured torsional oscillation frequency and the induced twist at the first set of operating conditions, and the measured torsional oscillation frequency and the stiffness at the second set of operating conditions to determine the torque induced in the shaft at the first set of operating conditions.

13. A system as claimed in claim 12 wherein the processor determines the torque as follows:

$$T_1 = \theta_1 \varepsilon_2 \left( \frac{\omega_1^2}{\omega_2^2} \right)$$

Where; $T_1$ is the torque at the first set of operating conditions, $\theta_1$ is the induced twist at the first set of operating conditions, $\varepsilon_2$ is the stiffness of the shaft at the second set of operating conditions, $\omega_1$ is the measured torsional oscillation frequency at the first set of operating conditions, $\omega_2$ is the measured torsional oscillation frequency at the second set of operating conditions.

14. A system as claimed in claim 11 further comprising means for determining the stiffness of the shaft at the second set of operating conditions by applying known torques to the shaft and measuring the resultant twists.

15. A system as claimed in claim 11 wherein the sensors for measuring the induced twist also measure the torsional oscillation frequency.

16. A system as claimed in claim 11 wherein the sensors are multipole sensors.

17. A system as claimed in claim 11 wherein a temperature of the shaft varies between the first and second set of operating conditions.

18. A system as claimed in claim 17 wherein the shaft is such that any change in moment of inertia of the shaft between the first set of operating conditions and the second set of operating conditions is negligible.

19. A system as claimed in claim 11 wherein the shaft is in gas turbine engine.

* * * * *